United States Patent [19]

Chang et al.

[11] Patent Number: 4,863,815
[45] Date of Patent: Sep. 5, 1989

[54] CELL DESIGN FOR SPIRALLY WOUND RECHARGEABLE ALKALINE METAL CELL

[75] Inventors: On-Kok Chang; John C. Hall, both of San Jose; Jeffrey Phillips, Saratoga; Lenard F. Sylvester, Scotts Valley, all of Calif.

[73] Assignee: Altus Corporation, San Jose, Calif.

[21] Appl. No.: 202,264

[22] Filed: Jun. 6, 1988

[51] Int. Cl.⁴ .............................................. H01M 6/10
[52] U.S. Cl. ...................................... 429/94; 429/50; 429/194; 429/211; 429/48; 29/623.5
[58] Field of Search ....................... 429/94, 47, 48, 49, 429/194, 211, 50; 204/196, 197; 29/623.5

[56] References Cited

U.S. PATENT DOCUMENTS

| | | | |
|---|---|---|---|
| 4,375,501 | 3/1983 | Peled et al. | 429/94 |
| 4,622,277 | 11/1986 | Bedder et al. | 429/94 |
| 4,664,989 | 5/1987 | Johnson | 429/94 |

Primary Examiner—Anthony Skapars
Attorney, Agent, or Firm—Limbach, Limbach and Sutton

[57] ABSTRACT

A rechargeable electrochemical cell having a cell casing housing a stack of spirally wound elements which include an alkaline metal anode, a cathode or cathode collector and a separator. A method is provided for preventing alkaline metal dendrites from forming on any surface within the cell casing and external to the stack of spirally wound elements.

10 Claims, 1 Drawing Sheet

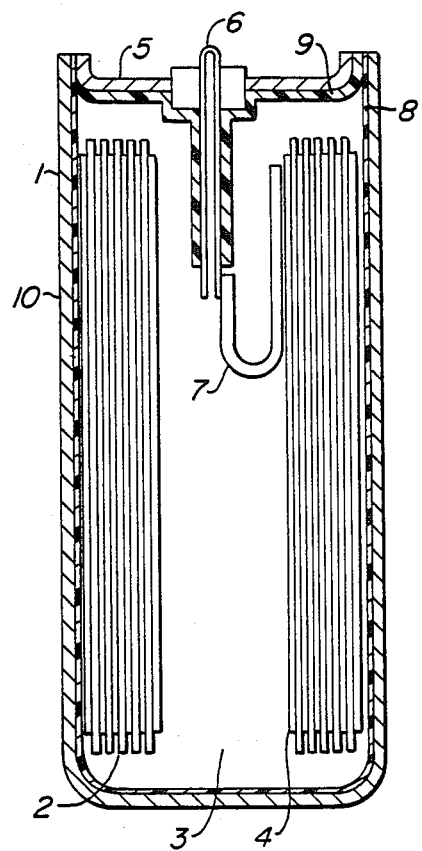 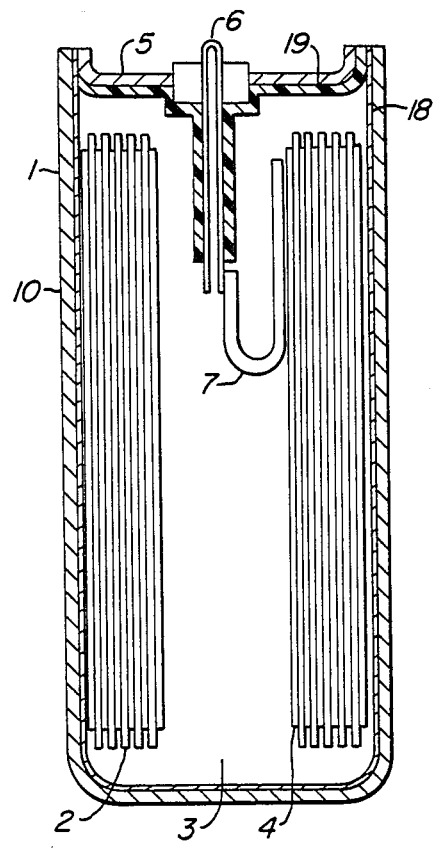
FIG._1.    FIG._2.

CELL DESIGN FOR SPIRALLY WOUND RECHARGEABLE ALKALINE METAL CELL

TECHNICAL FIELD OF INVENTION

The present invention deals with a rechargeable electrochemical cell and method for increasing the useful life of said cell. It has been found that cell life is substantially reduced when anode material such as lithium metal is allowed to form dendrites on the interior surface of the cell casing. The present invention deals with the prevention of said dendrite growth.

BACKGROUND OF THE INVENTION

This invention relates, generally, to non-aqueous electrochemical cells and more particularly to inorganic cells employing lithium metal as the anode which is spirally wound with a separator and cathode or cathode collector. Commercial electrochemical cells, referred to as lithium/$SO_2$ cells, typically contain lithium anodes and electrolytes comprised of a salt such as LiBr dissolved in a solvent mixture of liquified $SO_2$ and an organic co-solvent, such as acetonitrile. The cathodes of such cells are usually comprised of a carbon black such as Shawinigan black (acetylene black) formed on an expanded metal substrate.

Discharge of such cells results in the formation of the anode metal dithionite at the carbon cathode surface. In such cells, the $SO_2$ fluid cathode depolarizer reacts directly with the anode metal cations to form such dithionite product. Since the cathode reaction is a direct one between the anode and fluid cathode depolarizer, the carbon cathode collector only provides a catalytic surface for such reaction.

The spiral wound configuration permits high currents to be drawn; however, this high power output can render cells unsafe in abusive conditions. For example, it is very difficult to manufacture cells having identical capacities. Therefore, when cells are discharged in series it is possible that one cell will exhaust its capacity before the others and is driven into a state of voltage reversal.

It is recognized that spirally wound non-aqueous electrochemical cells having lithium or similar alkali or alkaline earth metal anodes commonly have a lower cycle life than comparable aqueous systems, which employ cadmium or lead negative electrodes. A major cause of the death of such lithium cells is the formation of dendrites which grow from the lithium electrode and make electronic contact with complementary positive electrodes.

There have been various teachings of the problems resulting from dendrite growth between the anode and cathode. One such teaching can be found in U.S. Pat. No. 4,622,277 dated Nov. 11, 1986. In this reference, it is taught to use an exposed inert conductive metal coupled mechanically and electrically to the cathode and a dendrite target comprised of a second segment of exposed inert conductive metal coupled mechanically and electrically to the anode. It is taught when these electrodes are spirally wound, the two pieces of inert metal are oriented such that they face each other and are held in physical isolation by the separator which is interposed therebetween. During voltage reversal abuse, dendrites grow from the first segment of inert metal to the dendrite target, thereby creating a low resistance pathway between the two pieces of inert metal. This situation can occur relatively harmlessly when the cell is fully discharged as the voltage is driven negative since at this time the cell has minimal energy content.

It has been determined that if a dendritic short occurs external to the cell stack, in a fully charged or partially charged cell, the results can be much more severe. Through this dendritic short passes excessive amounts of current, resulting in excessive heat generation, which may result in cell venting.

It is thus an object of the present invention to provide a cell and method for its manufacture which substantially reduces the formation of alkaline metal-based dendritic shorts external to the spirally wound cell stack.

This and further objects will be more readily appreciated when considering the following discussion and appended drawings, wherein FIGS. 1 and 2 depict typical spirally wound non-aqueous cells in cross-section as two embodiments produced pursuant to the present invention.

SUMMARY OF THE INVENTION

The present invention deals with a rechargeable electrochemical cell and method for increasing its usable life. The cell is provided with a casing which houses a stack of spirally wound elements which include a lithium metal anode, a cathode or cathode collector, and a separator. The method comprises preventing lithium dendrites from forming on any surface within the cell casing external to the stack of spirally wound elements.

DETAILED DESCRIPTION OF THE INVENTION

Although lithium metal represents an excellent anode material electrochemically, this alkaline metal is characterized as having extremely good "throwing power." This simply means that lithium has a strong tendency to form dendrites remote from the anode—a tendency enhanced by the protective film which is formed as a result of the reaction between the lithium metal and the solvent in the cell. This film presents a uniform impedance profile for lithium deposition irrespective of the spatial orientation of the anode with respect to the positive electrode.

This situation is further exacerbated by the presence of a highly conductive electrolyte such as is present in the cell Li/$LiAlCl_4(SO_2)_1$/$CuCl_2$/C. Such a highly conductive medium encourages lithium deposition within the cell casing at remote locations even on surfaces which are isopotential to the lithium electrode.

The present invention contemplates several alternative approaches to the prevention or at least minimization of the formation of lithium dendrites external to the cell stack. A first approach is to cathodically protect the cell casing by electrically connecting it to the lithium electrode. Since the casing potential is thus restricted from moving to potentials which are more corrosive and result in casing dissolution, the system is considered stable. When this is done, however, the exposed interior of the casing acts as a center for lithium deposition, with consequent dendrite formation external to the cell stack. In order to prevent this phenomenon in negative casing cells, the exposed can area and any exposed current collector must be insulated from the electrolyte solution. This is achieved by coating the casing, including its top, with suitable polymers, or by confining the cell stack in a suitable inert liner. Examples of suitable polymers or liners which may be used in practicing the present invention include one or more polymers selected from the group consisting of ethylene-tetrafluoroethylene, polyethylene, polypropylene and polytetrafluoroethylene.

Such a configuration is shown in FIG. 1, wherein cell 10 is shown in cross-section bounded by cell casing 1 and top 5. Spirally wound cell stack 2 is depicted within casing 1 which also is provided with area 3 for containing the electrolyte/solvent combination. When casing 1 is connected to the anode, coatings 8 and 9 shown on the casing sidewall and top, respectively, comprised of, for example ethylene-tetrafluoroethylene, is provided to electrically insulate the casing sidewall and top for the reasons provided above. Such coatings can be in the order of 0.1–20 mils, and are generally applied by spraying.

As an alternative embodiment, the casing of the cell can be maintained at the potential of the positive electrode. When this is done, however, the casing must be configured of a suitable material which does not corrode at the normal operating potentials of the cell. It has been found that a number of materials can be used either as the casing materials or as coatings on the interior of the casing. Such a material can be a member selected from the group consisting of nickel, molybdenum, chrome and stainless steel. While the case is at a positive potential there is no driving force to induce dendrites to grow from the lithium electrode toward the inner surface of the casing since there is no active material at the case surface to allow ionic current to pass between the two locations. Such a configuration is shown in FIG. 2. Coating 18 need not be insulative, but instead a coating which merely protects the positive potential casing from corrosion. It is prudent to provide insulative coating 19 over the cell top 5 and over the pin/fill tube 6 because these later elements oftentimes are brazed to the cell casing and are at negative potentials which act as lithium deposition sites. Tefzel, which is an ethylene-tetrafluoroethylene copolymer available from Raychem Corporation, can be employed as coating 19.

Yet another consideration which must be accounted for in practicing the present invention is the prevention of dendrites of lithium from growing on current collection tab 7 of the negative electrode. As shown, this tab extends from the spirally wound stack 2 to pin 6 located atop the casing. The tab, as shown, is exposed to positive active material in the cell stack and, therefore, must be protected from lithium deposition.

In order to insulate the pin, a coating 9/19 of a suitable inert polymeric material such as ethylene-tetrafluoroethylene can be provided as shown. However, the pin must be spot welded to the negative tab 7 which means that an uncoated area must be made available at the pin tip to provide a suitable welding surface.

In practicing the present invention, it is contemplated that the exposed spot welded area be removed from areas of positive potential which could provide a shorting path in the event of dendrite growth. This is accomplished by extending the pin such that the spot weld is located in the central mandrel hole of the cell and is surrounded by the inner wrap of negative electrode 4 such as shown in the appended figures. Thus, in the event of lithium dendrite formation, there would be no driving force to create a short between the spot weld surface and the stack, for such surface would be surrounded by the negative lithium anode.

Table I shows the results of cycling three cells of different design. All cells were cycled similarly. The cells were charged at 40 mA for approximately 12 hours until voltage reached 3.95 V. The current was then allowed to decrease for a further three hours. The discharge was then initiated at 100 mA and was continued until the voltage fell to 3.15 V. Cell No. 1 is of the present invention wherein a positive can has been coated with a protective surface and its top and fill tube/negative pin with an insulative coasting as shown in FIG. 2. After 30 charge/discharge cycles, none of the 19 cells exhibited failure.

The second group of cells being tested differed from the first group only in providing a short and uncoated fill tube/pin. As previously noted, when the pin is short, the weld to the tab, which cannot be coated, does not extend into the inner wrap of the negative electrode and thus must be exposed to an area of positive potential. This provides an area of fertile lithium deposition and resultant cell failure which is born out by the results expressed in Table I.

The third group of test cells employed a negative can but without the insulative coating of the present invention. As shown, after 30 charge/discharge cycles, 7 cells failed of the 36 tested.

TABLE I

| Design | Total Number Cells | No. Failed to 30 Cycles |
| --- | --- | --- |
| 1. Positive Can - Long Coated Pin | 19 | 0 |
| 2. Positive Can - Short Uncoated Pin | 8 | 5 |
| 3. Negative Can | 36 | 7 |

We claim:

1. A method for increasing the usable life and safety of a rechargeable electrochemical cell having a cell casing housing a stack of spirally wound elements which include an alkaline metal anode, a cathode or cathode collector and a separator, the method comprising preventing lithium dendrites from forming on any surface within said cell casing external to said stack of spirally wound elements by maintaining said cell casing at substantially the same potential as the alkaline anode and providing said cell casing with an insulative, inert liner.

2. The method of claim 1 wherein said insulative inert liner comprises a polymer which is a member selected from the group consisting of ethylene-tetrafluoroethylene, polyethylene, polypropylene and polytetrafluoroethylene.

3. The method of claim 1 wherein said anode is provided with a tab for electrically connecting the anode with a pin located atop the cell casing as a negative terminal, said pin being coated with an inert, insulative coating for preventing alkaline metal dendrites from forming thereon.

4. The method of claim 3 wherein said coating comprises a polymer selected from the group consisting of ethylene-tetrafluoroethylene, polyethylene, polypropylene and polytetrafluoroethylene.

5. The method of claim 3 wherein said pin and tab are connected by spot welding and said pin is extended a sufficient length within the casing such that the spot weld is located substantially at the center of said spirally wound elements surrounded immediately by the anode.

6. In a rechargeable electrochemical cell having a cell casing housing stack of spirally wound elements which include an alkaline metal anode, a cathode or cathode collector and a separator, the improvement comprising increasing the usable life of the rechargeable electrochemical cell by preventing lithium dendrites from forming on any surface within said cell casing external to said stack of spirally wound elements by maintaining said casing at substantially the same potential as said alkaline metal anode and providing said cell casing with an insulative, inert liner.

7. The rechargeable electrochemical cell of claim 6 wherein said insulative inert lining comprises a polymer which is a member selected from the group consisting of ethylene tetrafluoroethylene polymer, polyethylene, polypropylene, and polytetrafluoroethylene.

8. The rechargeable electrochemical cell of claim 6 wherein said anode is provided with a tab for electrically connecting said anode with a pin located atop the cell casing as a negative terminal, said pin being coated with an inert, insulative coating for preventing alkaline metal dendrites from forming thereon.

9. The rechargeable electrochemical cell of claim 8 wherein said coating comprises a polymer selected from the group consisting of ethylene-tetrafluoroethylene, polyethylene, polypropylene and polytetrafluoroethylene.

10. The rechargeable electrochemical cell of claim 8 wherein said pin and tab are connected by spot welding, and said pin is extended a sufficient length within the casing such that the spot weld is located substantially at the center of said spirally wound elements surrounded immediately by said anode.

* * * * *